United States Patent
Smith et al.

(10) Patent No.: US 11,369,914 B2
(45) Date of Patent: Jun. 28, 2022

(54) PROCESS AND APPARATUS FOR THE REMOVAL OF METABOLIC CARBON DIOXIDE FROM A CONFINED SPACE

(71) Applicant: SKYTREE B.V., Amsterdam (NL)

(72) Inventors: Ian Smith, Amsterdam (NL); Piotr Thomasz Kasper, Amsterdam (NL); Maximus Llewelyn Beaumont, Amsterdam (NL)

(73) Assignee: SKYTREE, B.V., Amsterdam (NL)

( * ) Notice: Subject to any disclaimer, the term of this patent is extended or adjusted under 35 U.S.C. 154(b) by 302 days.

(21) Appl. No.: 16/487,363

(22) PCT Filed: Feb. 22, 2018

(86) PCT No.: PCT/NL2018/050115
§ 371 (c)(1),
(2) Date: Aug. 20, 2019

(87) PCT Pub. No.: WO2018/156020
PCT Pub. Date: Aug. 30, 2018

(65) Prior Publication Data
US 2020/0030738 A1    Jan. 30, 2020

(30) Foreign Application Priority Data

Feb. 22, 2017 (NL) .................................... 2018407

(51) Int. Cl.
B01D 53/02 (2006.01)
B01D 53/04 (2006.01)
(Continued)

(52) U.S. Cl.
CPC ..... B01D 53/0446 (2013.01); B01D 53/0438 (2013.01); B01D 53/12 (2013.01);
(Continued)

(58) Field of Classification Search
CPC ........ B01D 2252/204; B01D 2253/202; B01D 2253/25; B01D 2253/304;
(Continued)

(56) References Cited

U.S. PATENT DOCUMENTS

2001/0043881 A1   11/2001 Wagner et al.
2009/0032023 A1    2/2009 Pastre et al.
(Continued)

FOREIGN PATENT DOCUMENTS

CA    2973462 A1    9/2016
DE    19653964 A1   6/1998
(Continued)

OTHER PUBLICATIONS

International Search Report from corresponding PCT Application No. PCT/NL2018/050115, dated Jun. 15, 2018.

*Primary Examiner* — Christopher P Jones
(74) *Attorney, Agent, or Firm* — Harness, Dickey & Pierce, P.L.C.

(57) ABSTRACT

An apparatus and process for separating and removing $CO_2$ generated by one or more passengers in the air in the interior of a cabin of a vehicle. Provided are: —a first stream of the air from the interior of the cabin to an interior of a container holding a loose particulate sorbent for $CO_2$; —a second stream of air depleted in $CO_2$ from the interior of the container holding the sorbent to an interior of the cabin; —a third stream of the air from exterior of the cabin to the inferior of the container holding the sorbent; and —a fourth stream of air enriched in $CO_2$ from the interior of the container holding the sorbent to an exterior of the cabin.

15 Claims, 12 Drawing Sheets

(51) Int. Cl.
*B01D 53/12* (2006.01)
*B60H 1/00* (2006.01)
*B60H 3/06* (2006.01)

(52) U.S. Cl.
CPC ......... *B60H 1/0025* (2013.01); *B60H 3/0633* (2013.01); *B01D 2253/202* (2013.01); *B01D 2253/25* (2013.01); *B01D 2253/304* (2013.01); *B01D 2257/504* (2013.01); *B01D 2259/4009* (2013.01); *B01D 2259/4566* (2013.01); *B60H 2003/0691* (2013.01)

(58) Field of Classification Search
CPC .......... B01D 2257/504; B01D 2258/06; B01D 2259/4009; B01D 2259/4566; B01D 53/0438; B01D 53/0446; B01D 53/12; Y02C 10/08
See application file for complete search history.

(56) References Cited

U.S. PATENT DOCUMENTS

| | | | |
|---|---|---|---|
| 2011/0005390 A1* | 1/2011 | Haugan | B01J 20/265 95/27 |
| 2014/0112856 A1* | 4/2014 | Krutka | B01D 53/047 423/228 |
| 2015/0078964 A1* | 3/2015 | Meirav | B01D 53/04 422/120 |
| 2016/0082383 A1 | 3/2016 | Meirav et al. | |
| 2016/0108344 A1* | 4/2016 | Patience | B01J 8/24 554/167 |
| 2016/0228809 A1 | 8/2016 | Meirav et al. | |

FOREIGN PATENT DOCUMENTS

| | | |
|---|---|---|
| DE | 19830470 C1 | 11/1999 |
| EP | 2465596 A1 | 6/2012 |
| JP | 2009090979 A | 4/2009 |
| WO | WO-2014153333 A1 | 9/2014 |
| WO | WO-2016038339 A1 | 3/2016 |
| WO | WO-2016152363 A1 | 9/2016 |

* cited by examiner

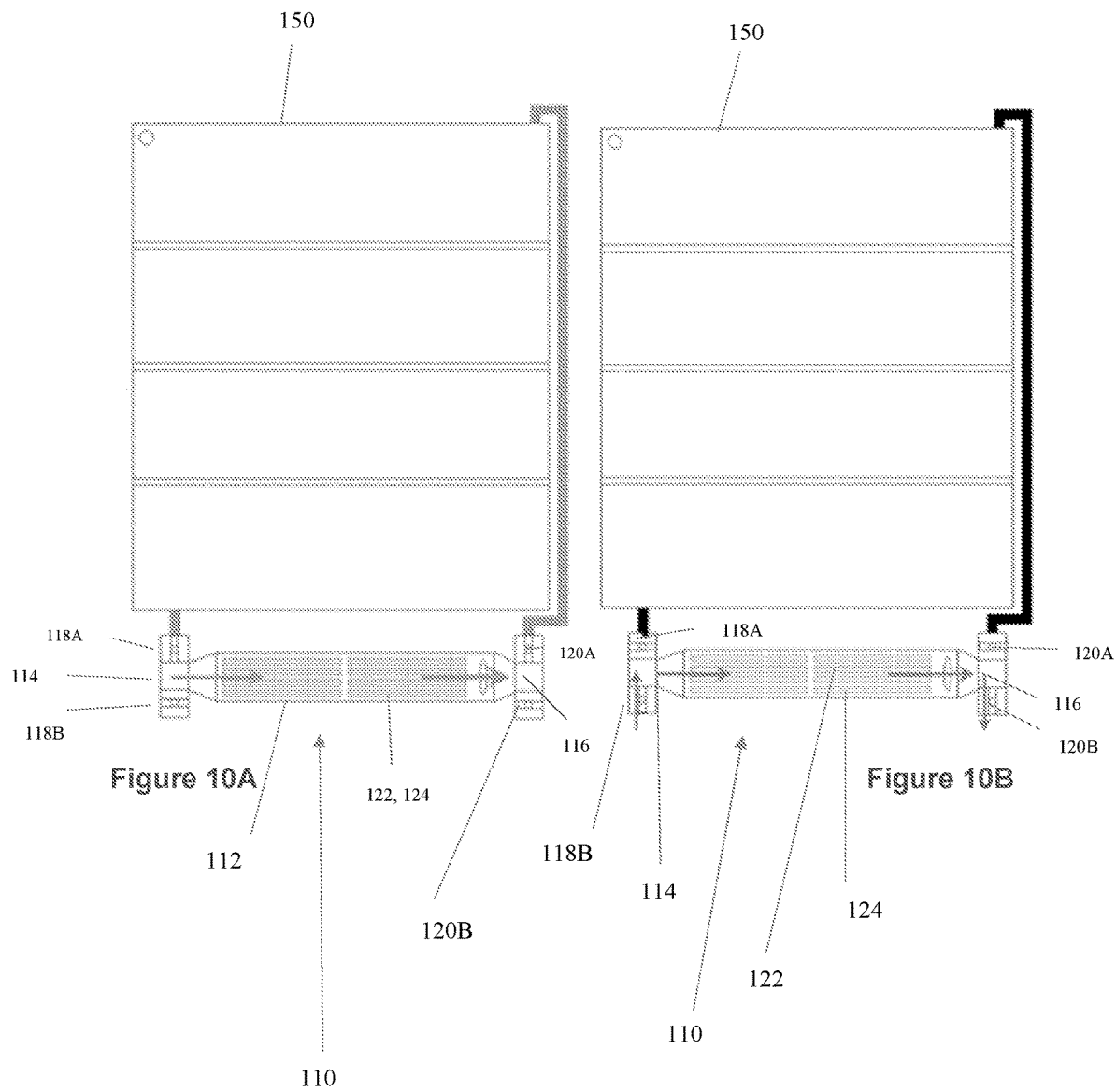

PROCESS AND APPARATUS FOR THE REMOVAL OF METABOLIC CARBON DIOXIDE FROM A CONFINED SPACE

CROSS-REFERENCE TO RELATED APPLICATIONS

This application is a national phase application of PCT Application No. PCT/NL2018/050115, filed on 22 Feb. 2018, which claims priority to Netherland Patent Application Nos. 2018407, filed on 22 Feb. 2017. The entire disclosure of the applications identified in this paragraph is incorporated herein by references.

TECHNICAL FIELD

The present invention relates to a process and apparatus for separating carbon dioxide ($CO_2$) from air in a confined space such as a passenger cabin of a vehicle (e.g., a car, truck, bus, boat, or airplane). This invention particularly relates to a process and apparatus for separating and removing $CO_2$ generated by passengers in the air in the interior of a vehicle cabin, using an amine-containing particulate material which can be processed to selectively adsorb and subsequently desorb the $CO_2$. This invention quite particularly relates to a process and apparatus for separating and removing $CO_2$ from air inside a vehicle cabin to keep the $CO_2$ concentration below a desired level in the cabin.

BACKGROUND OF THE INVENTION

Heating, ventilation and air conditioning (HVAC) systems can contribute very significantly to the energy requirements of passenger vehicles. Reducing the energy load of HVAC systems has become of considerable interest for potentially providing improved energy efficiency and fuel economy for vehicles. The energy costs of maintaining a viable atmosphere are even higher in the case of passenger aircraft, where a significant amount of energy is consumed for pressurizing and heating outside air.

WO 2016/038340 A1 describes a system for reducing the energy requirements for removing $CO_2$ from the passenger cabin of a vehicle. The system uses:
  a regenerative $CO_2$ sorbent material;
  means for moving air from the interior of the cabin over the regenerative $CO_2$ sorbent material to remove $CO_2$ from the air and then returning the air to the cabin; and
  means for moving a desorption gas (e.g., heated air from outside the cabin) over the sorbent material to desorb $CO_2$ from the sorbent material and then expel the desorbed $CO_2$ outside the cabin.
The system is described as able to maintain a $CO_2$ level below 1000 ppm in a passenger cabin for a period of at least 5 minutes while restricting the flow of air from outside the passenger cabin to 10 L/s or less.

However, this system still requires relatively large amounts of energy to move air, under pressure, from the interior of the cabin over a bed of regenerative $CO_2$ sorbent material to effectively remove $CO_2$ from the air and to move the desorption gas, under pressure, over the sorbent material to effectively desorb $CO_2$ from the sorbent material. Such energy requirements become particularly significant when this system is operated continuously over long periods of time (e.g., 1-5 hours).

To further reduce the energy requirements of this system, WO 2016/038340 A1 has proposed using a "radial flow bed" of particles of the sorbent material, rather than using a monolith having the sorbent material coated thereon or a bed of pellets or beads of the sorbent material. Also to further reduce energy requirements, WO 2016/038340 A1 has proposed using waste gases produced by the vehicle as a source of heated air for desorption of $CO_2$.

WO2016152363 A1, like WO 2016/038340 A1, describes a system for removing $CO_2$ from a gas stream from a room interior with a $CO_2$ adsorbent in a container. The container has inlets for admitting room air and outside air into the container and outlets for sending $CO_2$-depleted air to the room interior and to the outside. The system features induction heating or dielectric heating of the $CO_2$ adsorbent in the container.

However, ways have been sought for further reducing the energy requirements of such systems for removing $CO_2$ from the passenger cabin of a vehicle

SUMMARY OF THE INVENTION

In accordance with this invention, a process and apparatus are provided for separating and removing $CO_2$ generated by one or more passengers in the air in an interior of a cabin of a vehicle. The process and apparatus feature reduced energy requirements.

In the apparatus of this invention are provided:
a) a closed container, advantageously a single closed container, having an interior that holds loose, light and porous, solid particles of a sorbent, advantageously a packed bed or a fluidized bed, more advantageously a fluidized bed, of the particles of the sorbent:
   i) which can remove $CO_2$ from a first stream of the air when the first stream is contacted with the sorbent to form a second stream of air depleted in $CO_2$ and
   ii) from which $CO_2$ can be removed when a third stream of air is contacted with the sorbent to form a fourth stream of air enriched in $CO_2$;
b) a first inlet conduit providing fluid communication for the first stream of the air from the interior of the cabin to the interior of the container and to the sorbent particles therein;
c) a first outlet conduit providing fluid communication for the second stream of air depleted in $CO_2$ from the interior of the container and from the sorbent particles therein to the interior of the cabin;
d) a second inlet conduit providing fluid communication for the third stream of air from an exterior of the cabin to the interior of the container and to the sorbent particles therein; and
e) a second outlet conduit providing fluid communication for the fourth stream of air enriched in $CO_2$ from the interior of the container and from the sorbent particles therein to the exterior of the cabin.

Advantageously, each inlet conduit is in direct fluid communication with a lower portion, more advantageously a bottom, of the interior of the container, and with a lower portion, more advantageously a bottom, of the sorbent particles therein.

Also advantageously, a porous distributor, more advantageously a porous sintered metal or a porous ceramic plate, is within the lower portion, more advantageously, the bottom, of the interior of the container between each inlet conduit and the lower portion, more advantageously the bottom, of the sorbent particles therein.

Also advantageously, each outlet conduit is in direct fluid communication with an upper portion, more advantageously, a top, of the interior of the container and with an upper portion, more advantageously, a top, of the sorbent particles therein.

Also advantageously the sorbent is an amine-containing particulate material, more advantageously a free base amine bead functionalized with the primary amine benzyl amine and supported on a porous polyester structure crosslinked with divinyl benzene.

Also advantageously, a heater, more advantageously a heater connected to a motor of the vehicle, is provided for heating the third stream of air between the exterior of the cabin and the interior of the container.

Also advantageously, the second inlet conduit extends through the sorbent, more advantageously a fluidized bed of a loose particulate sorbent, and heats the sorbent by heat exchange form the third stream.

The process of this invention includes the following steps:
a). providing a first stream of the air from an interior of a passenger cabin of a vehicle to an interior of the container of the apparatus of any one of claims 1-13 and to the loose, light and porous, solid particles of a sorbent, advantageously the packed bed or the fluidized bed, more advantageously the fluidized bed, of the sorbent particles, therein through the first inlet conduit of the apparatus; and then
b). providing a second stream of air depleted in $CO_2$ from the interior of the container of the apparatus of any one of claims 1-13 and from the sorbent particles therein to the interior of the cabin through the first outlet conduit of the apparatus; and then
c). providing a third stream of the air an exterior of the cabin to the interior of the container of the apparatus of any one of claims 1-13 and to the sorbent particles therein through the second inlet conduit of the apparatus; and then
d). providing a fourth stream of air enriched in $CO_2$ from the interior of the container of the apparatus of any one of claims 1-13 and from the sorbent particles therein to the exterior of the cabin through the second outlet conduit of the apparatus.

Advantageously, the third stream of air is heated between the exterior of the cabin and the interior of the container, more advantageously heated by a motor of the vehicle.

BRIEF DESCRIPTION OF THE DRAWINGS

FIGS. 10A and 10B shows schematically the use of an alternative sealable enclosure 110 of this invention for removing $CO_2$ from outdoor air and providing the removed CO2 to an enclosed or confined, interior space, such as of a greenhouse.

DETAILED DESCRIPTION OF THE INVENTION

Figure 1:
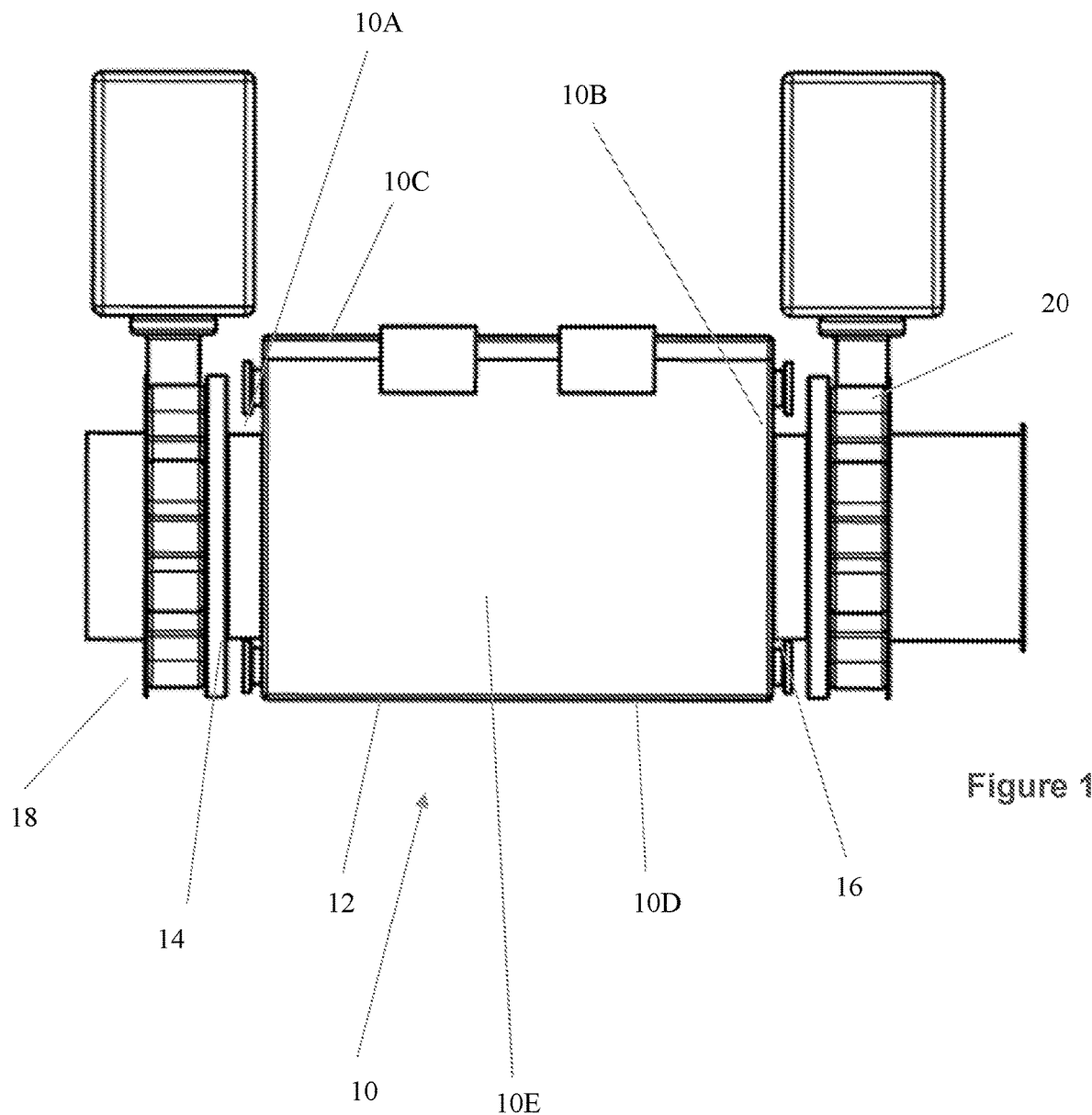
FIGS. 1, 2 and 3 show a sealable enclosure with a rigid vacuum chamber of this invention. Sealable inlet and outlet valves are mounted on opposite axial ends of the vacuum chamber.
Figure 2:
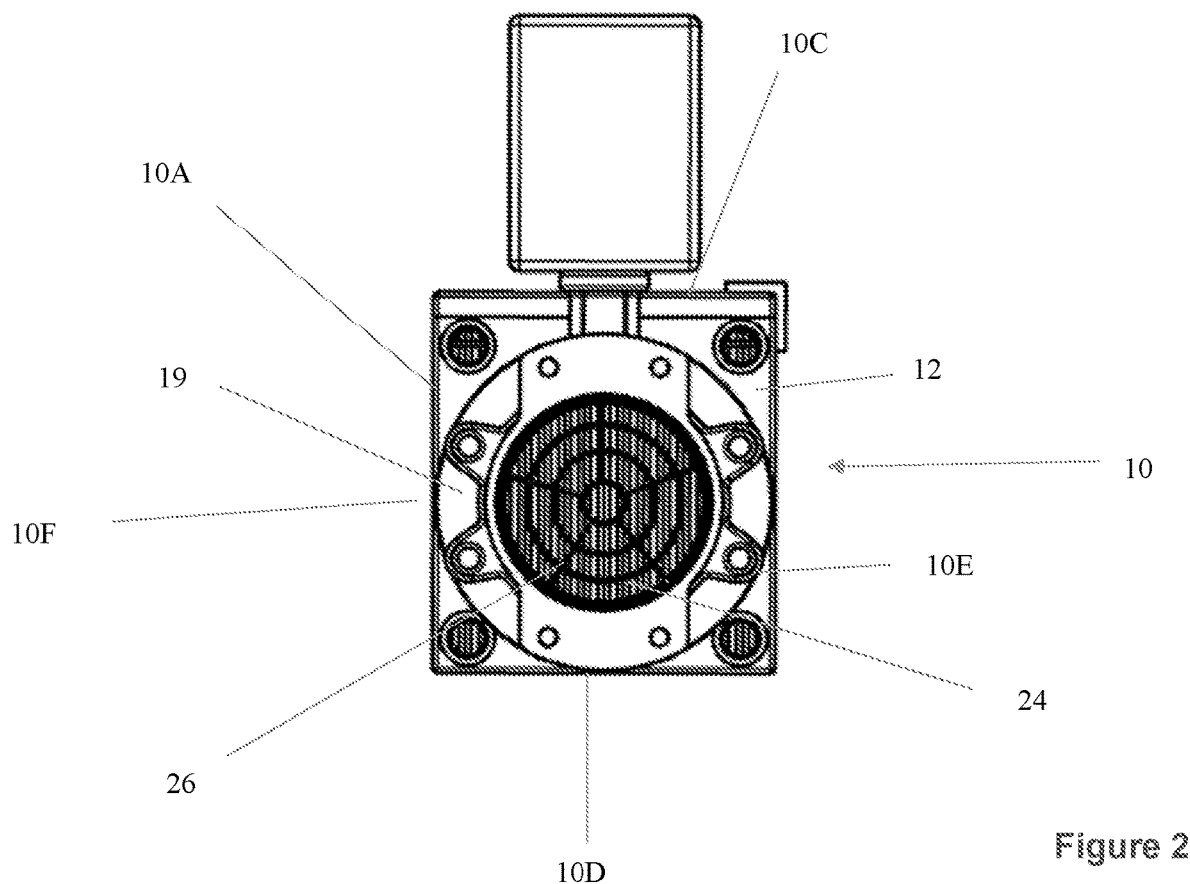
Figure 3:
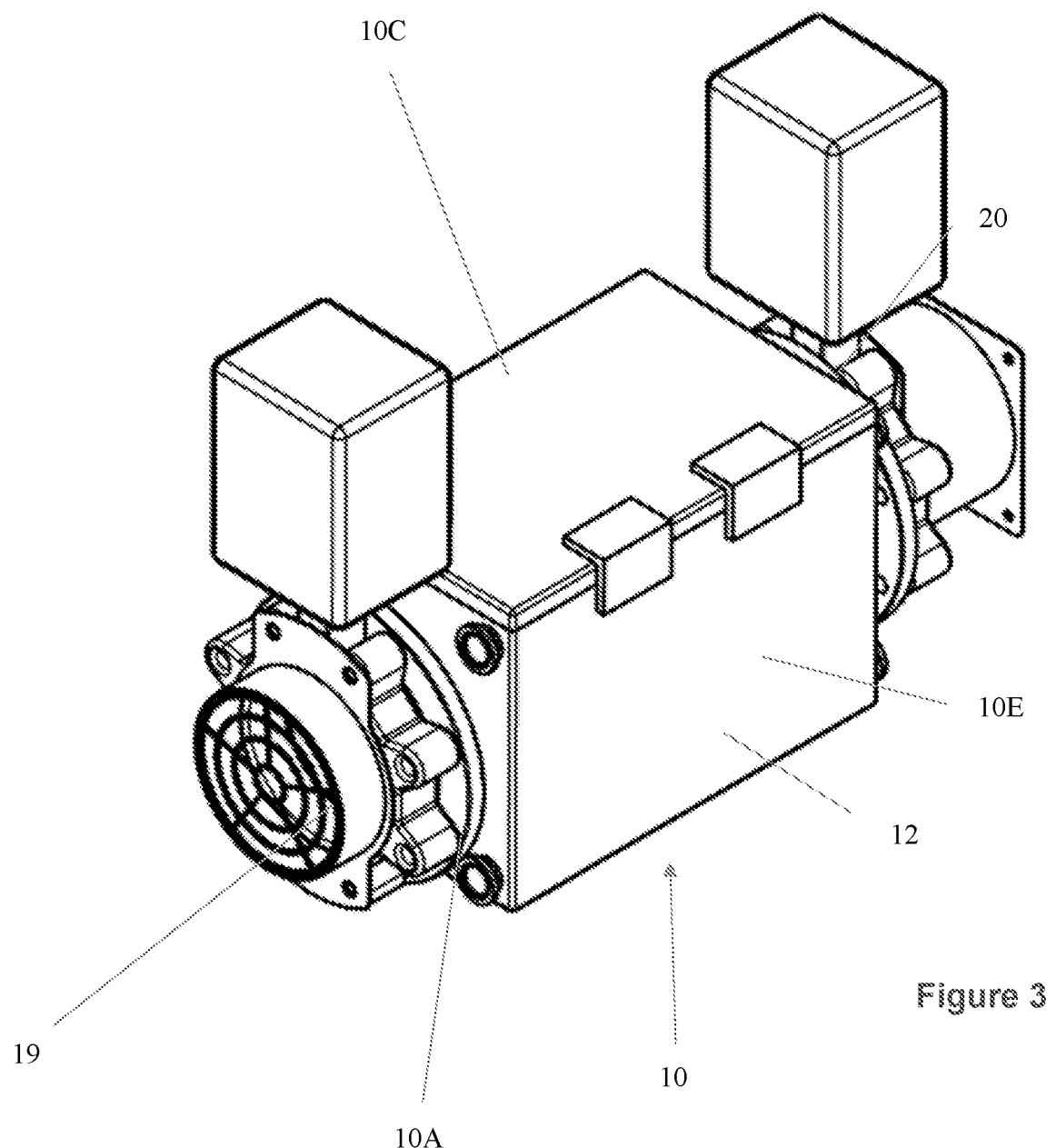
Figure 4:
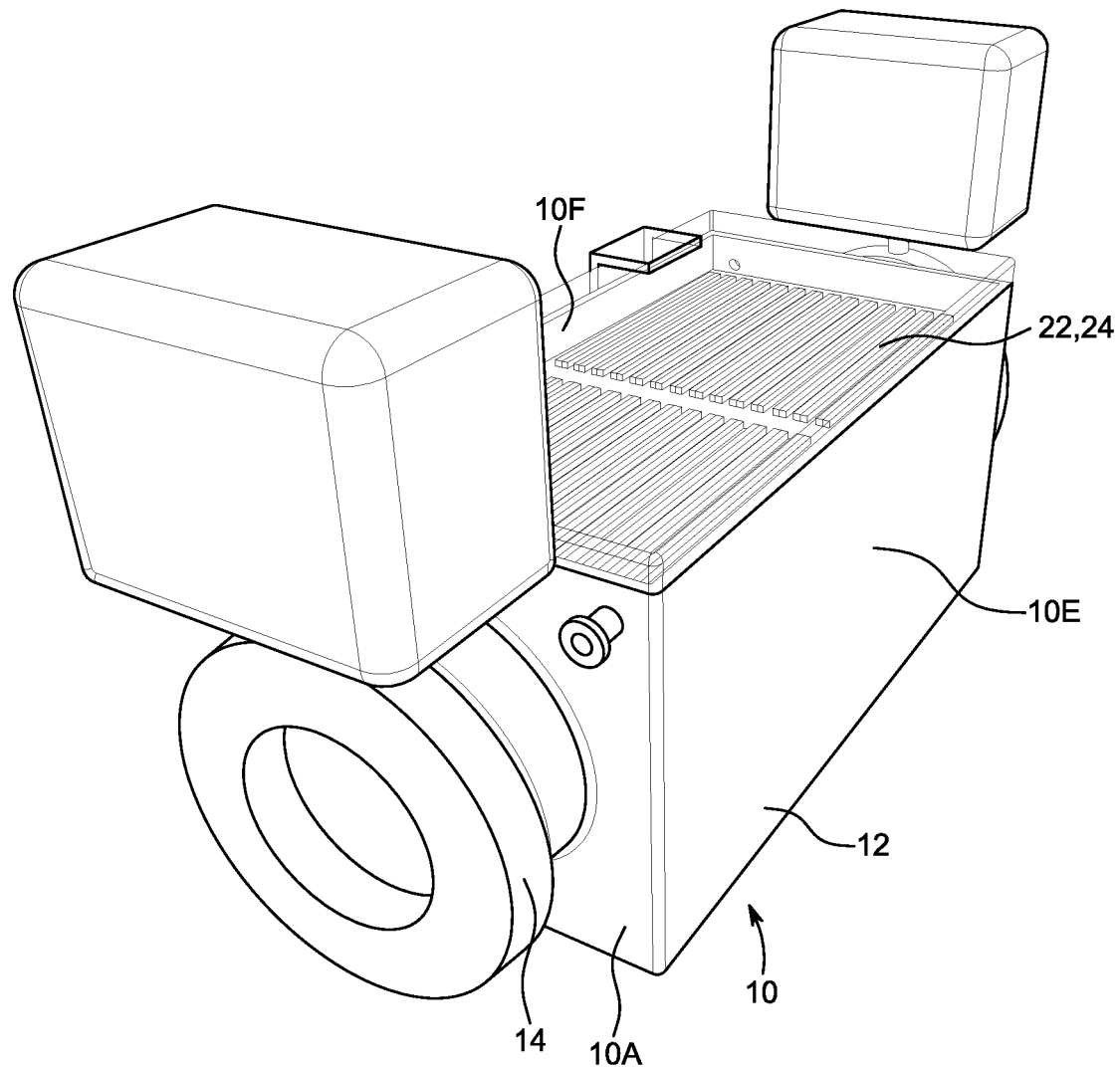
FIG. 4 shows the sealable enclosure of FIG. 1-3 (with the top wall of its vacuum chamber removed), containing two laterally-extending, axially spaced-apart, parallel stacks of axially- and vertically-extending, laterally spaced-apart, parallel cartridges or layers. Each stack contains a plurality of adjacent, parallel, laterally spaced-apart cartridges, and each cartridge encloses a measured amount of a particulate sorbent for a gaseous component (e.g., $CO_2$) of a gas stream (e.g., air) in accordance with this invention.
Figure 5:
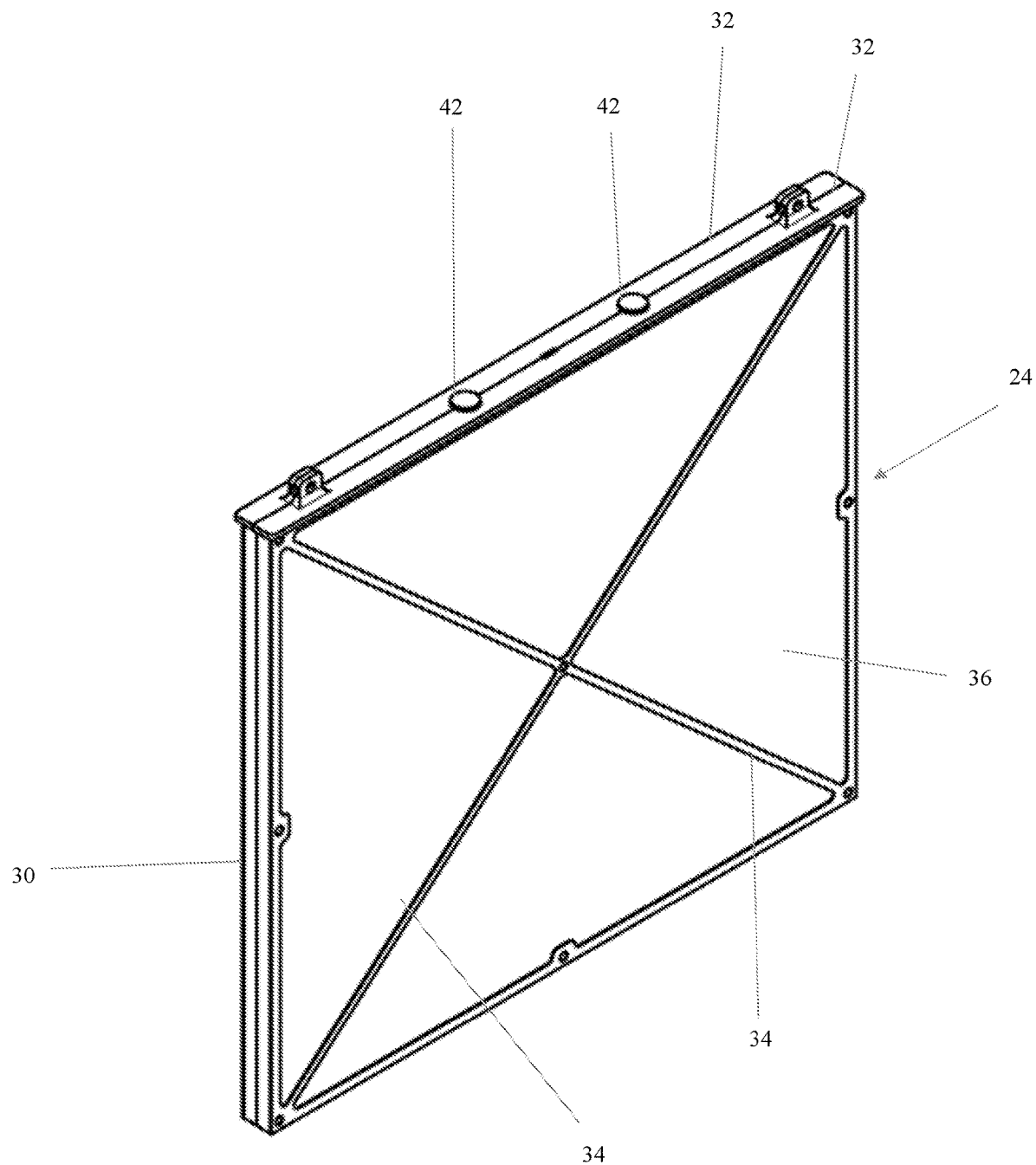
FIG. 5 is a perspective view of a single empty cartridge of this invention, adapted to be filled with and hold a measured amount of the sorbent (not shown) for the gaseous component in accordance with this invention. The cartridge features a rigid frame, which can hold the top, bottom and axial sides of a fabric (not shown), enclosing the measured amount of the sorbent. The frame is constructed from two frame members adapted to enclose and hold the fabric enclosure for the sorbent.
Figure 6:
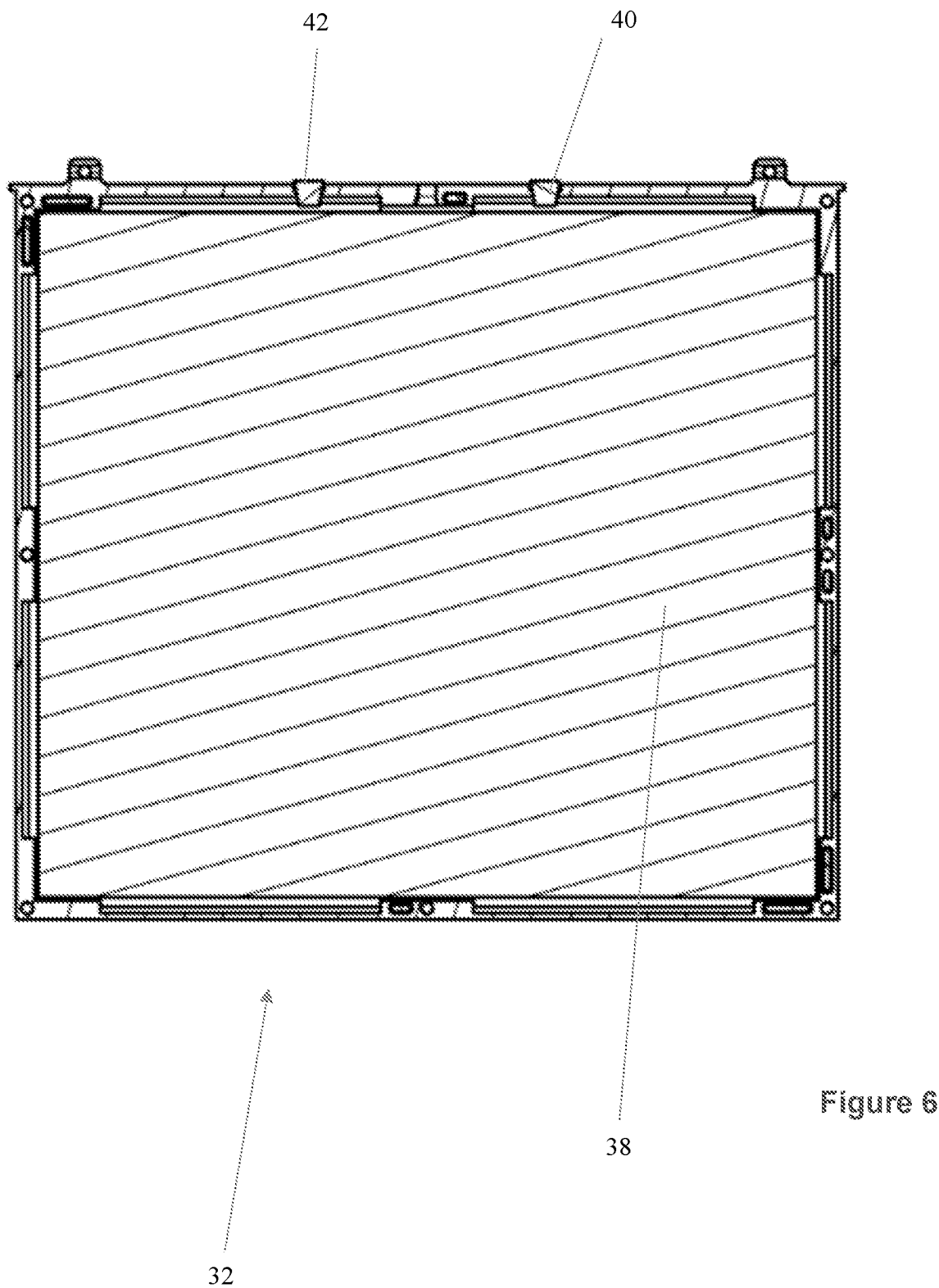
FIG. 6 is a plan view of a frame member of the frame of the cartridge of FIG. 5, containing a flat heating element extending substantially the full width and length of the cartridge.
Figure 7:
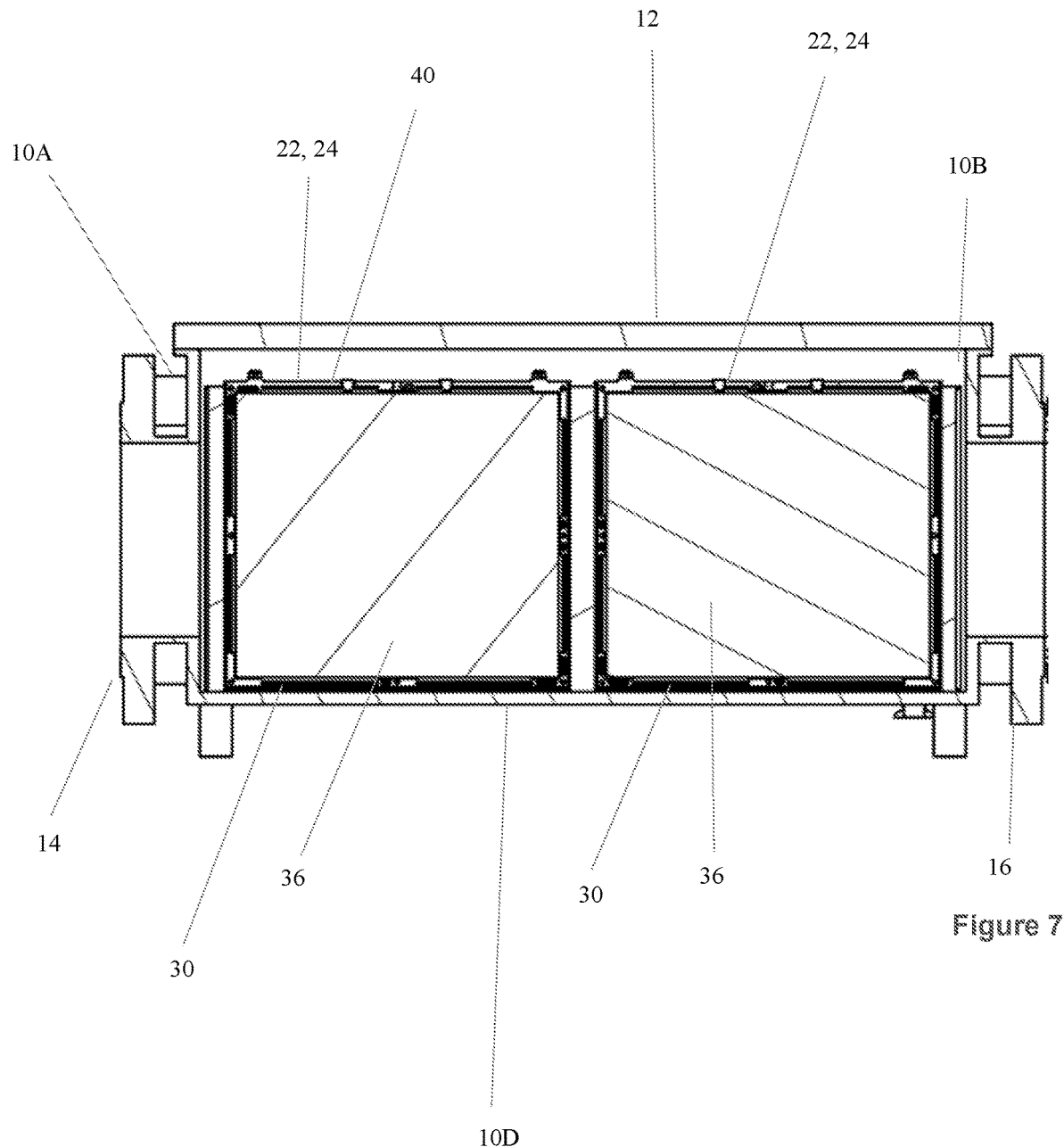
FIG. 7 is a sectional view, taken axially along the middle of the vacuum chamber of the sealable enclosure as shown in FIG. 3, showing cartridges in two parallel stacks of parallel cartridges of this invention, adapted to be filled with and hold measured amounts of the sorbent (not shown) in accordance with this invention.
Figure 8:
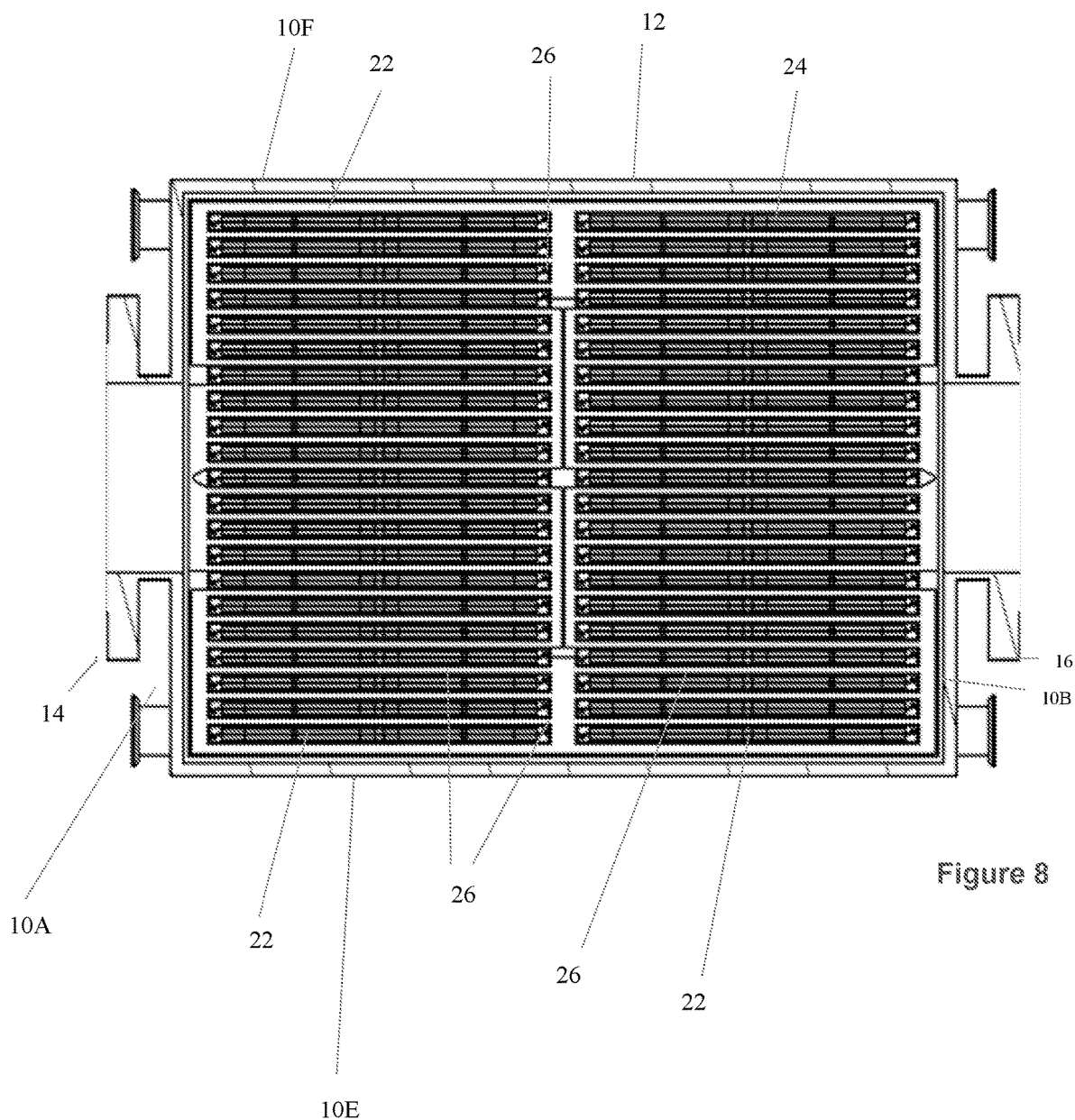
FIG. 8 is a top plan view of the open vacuum chamber as shown in FIG. 4 and showing its two laterally-extending, axially spaced-apart, parallel stacks of axially- and vertically-extending, laterally spaced-apart, parallel cartridges.
Figure 9:
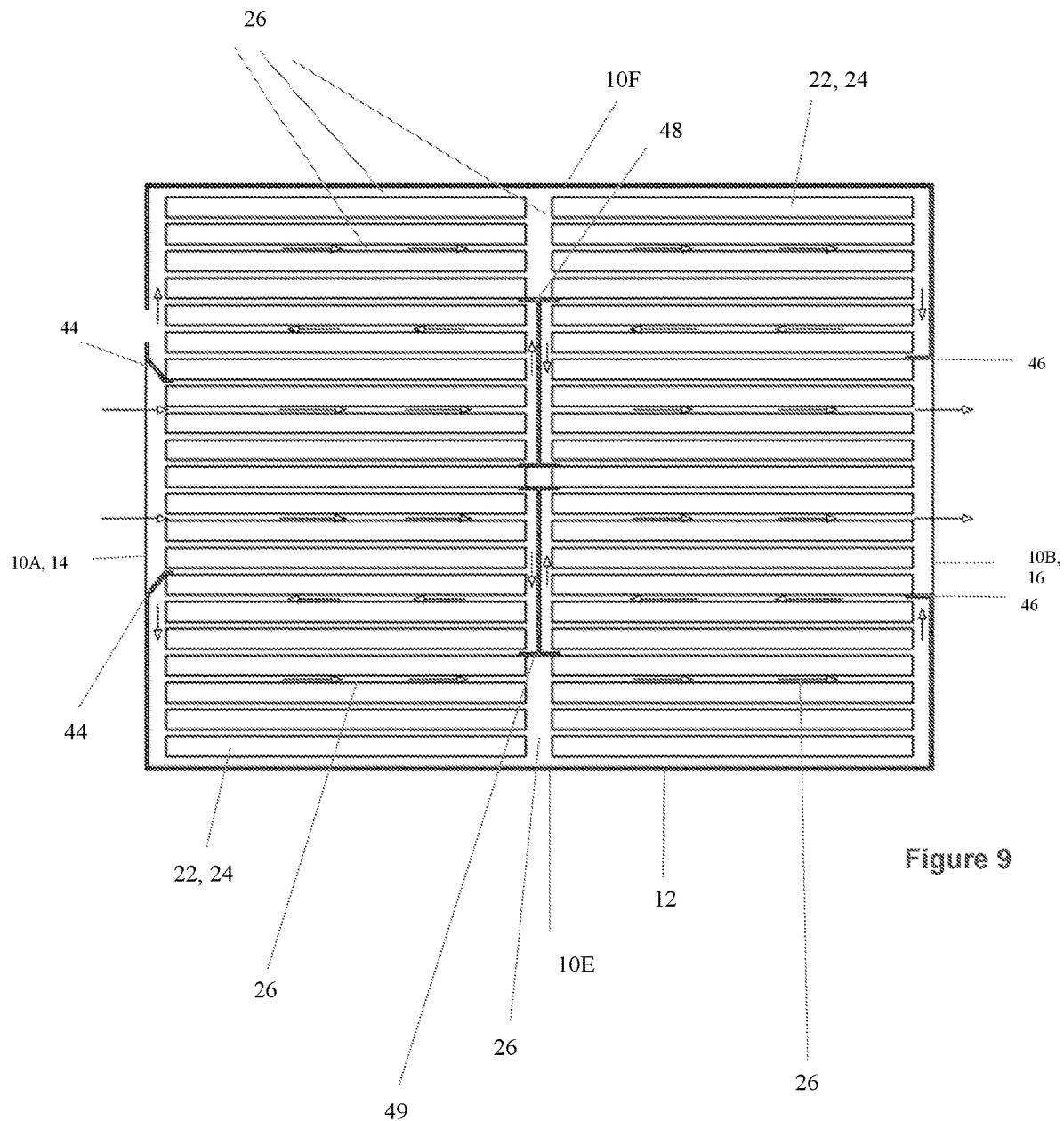
FIG. 9 is a simplified top view of the open vacuum chamber, like FIG. 8, showing (with arrows) a preferred flow of a gas stream axially through the vacuum chamber between its inlet and outlet and between the stacks of cartridges of this invention, so as to maximize the diffusion of the gas stream through the sorbent in the cartridges. Baffles are provided in the vacuum chamber for directing the flow of gas in a preferred serpentine flow pattern.
Figure 11A:
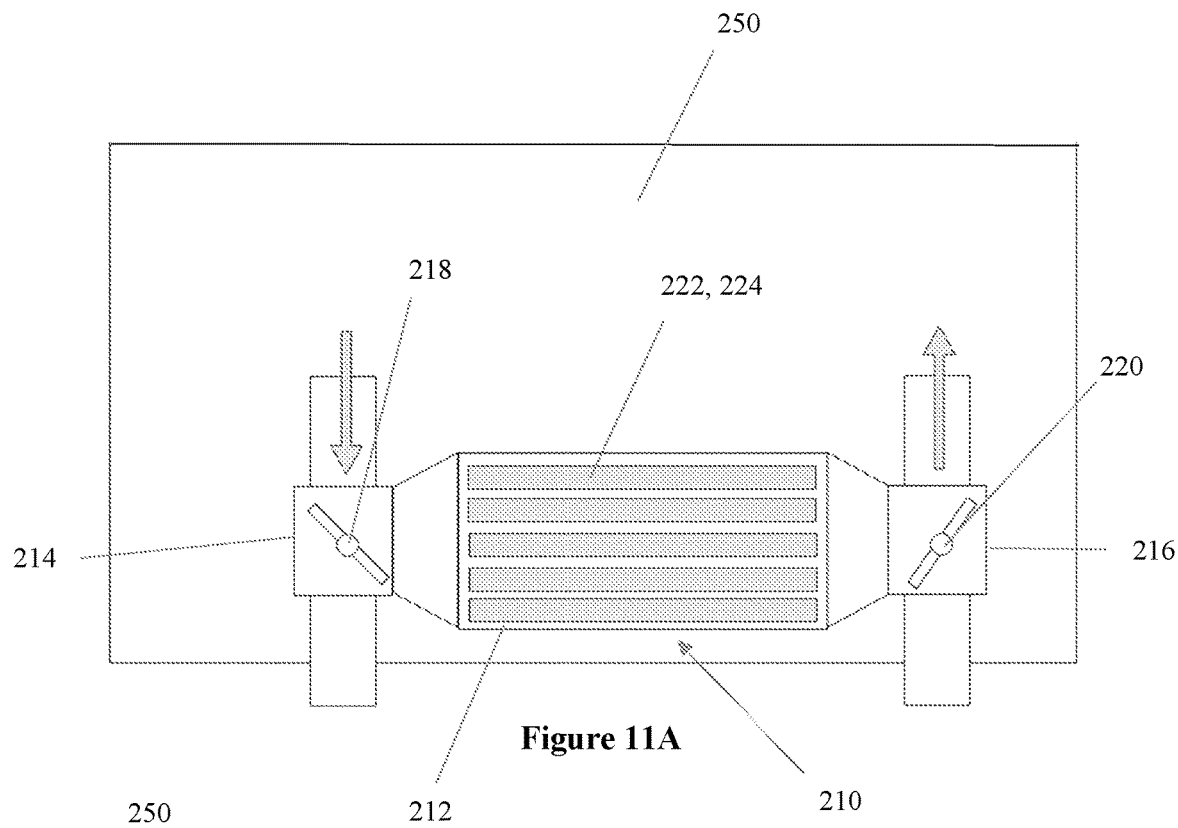
FIGS. 11A and 11B shows schematically the use of another alternative sealable enclosure 210 of this invention for removing $CO_2$ from an enclosed or confined, interior space, particularly of an apartment in a residential building, an office in a commercial office building, a car, a truck, a ship, an airplane or a bus.
Figure 11B:
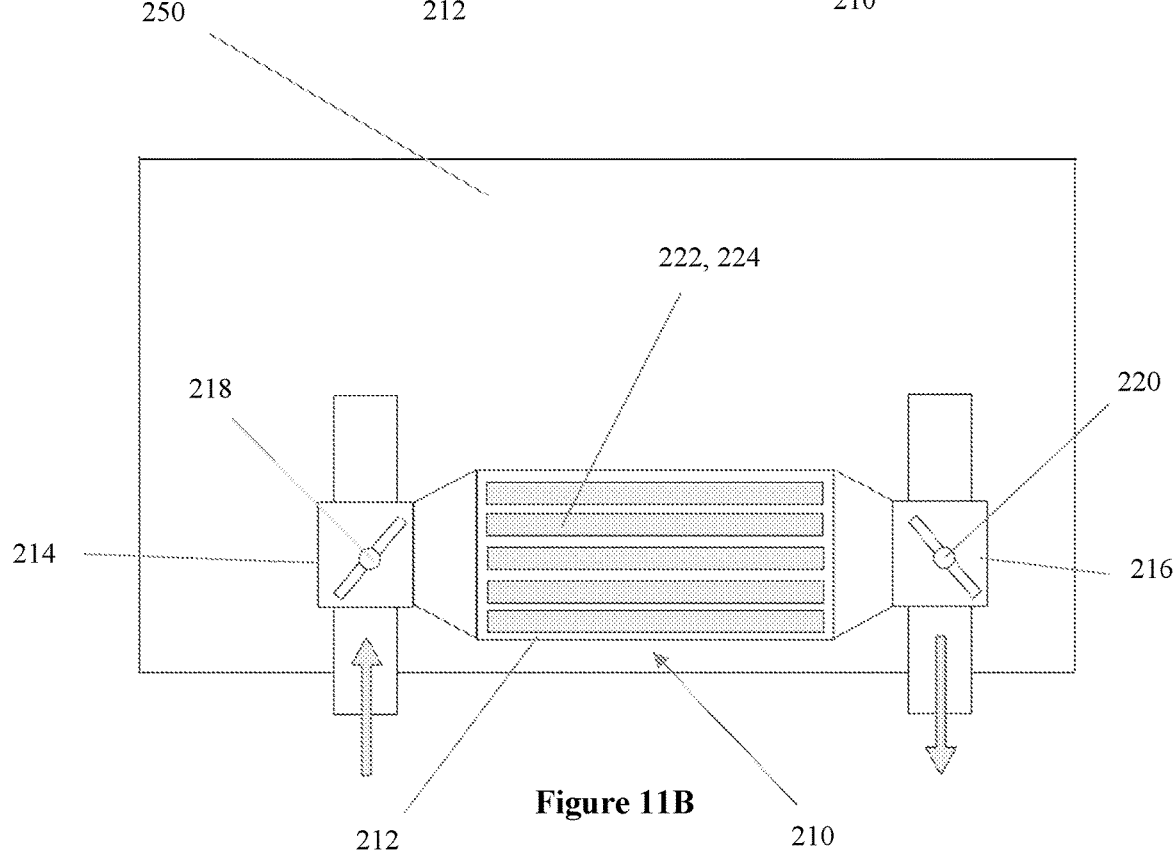
Figure 12A:
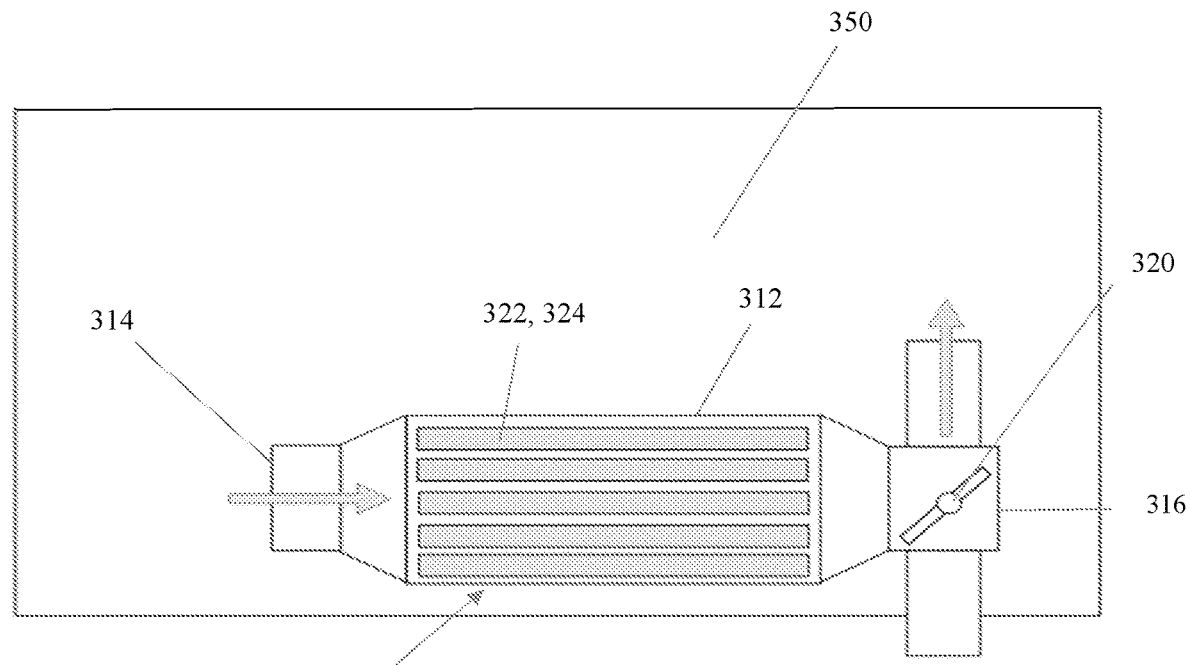
FIGS. 12A and 12B shows schematically the use of another alternative sealable enclosure 310 of this invention for removing CO2 from an enclosed or confined, interior space, particularly of an apartment in a residential building, an office in a commercial office building, a car, a truck, a ship, an airplane or a bus.
Figure 12B:
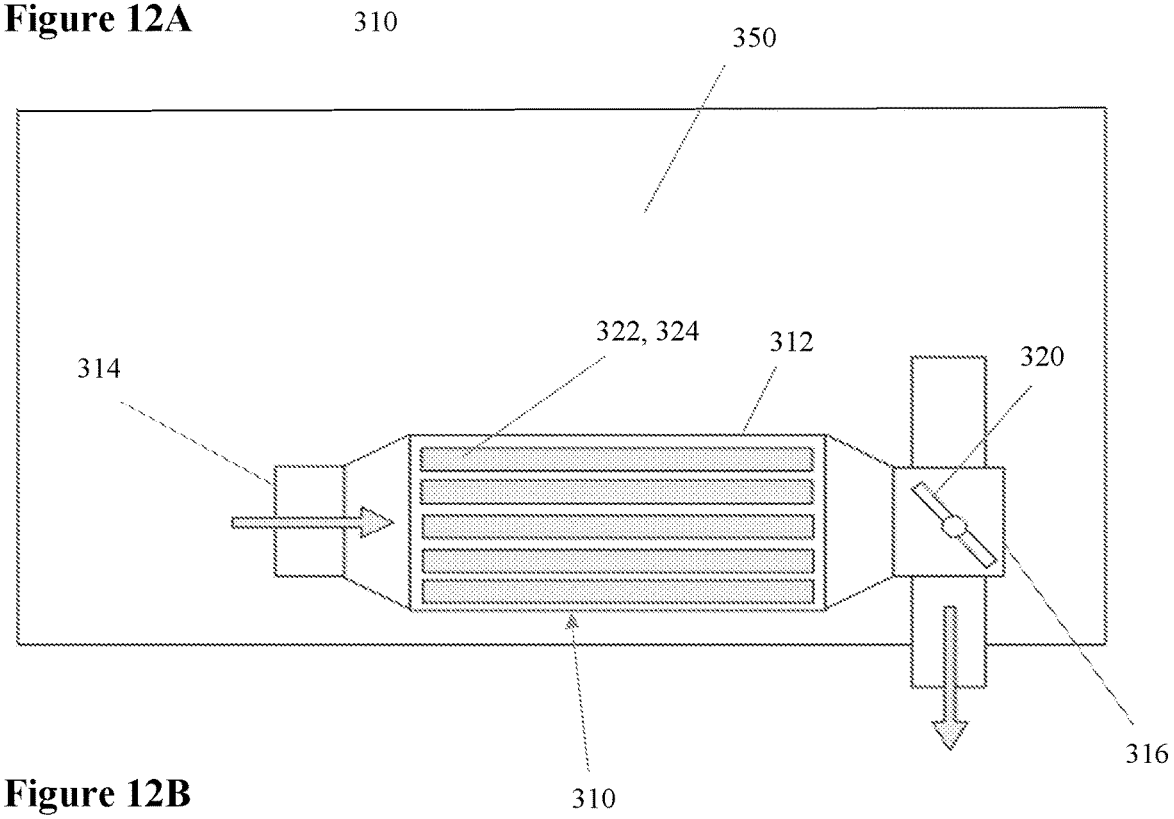

In accordance with this invention, a closed container is provided for: removing $CO_2$, from air in a passenger cabin of a vehicle (e.g., a car, truck, bus, boat, or airplane). The closed container preferably comprises a rigid cylindrical vacuum chamber which holds loose, light and porous, solid particles of a sorbent. The vacuum chamber is hermetically sealed, preferably vacuum sealed, except for air inlets and outlets as described below. The sorbent in the vacuum chamber of the closed container is adapted to adsorb, preferably at about ambient temperatures and pressures (e.g., at 20-40° C. and at 0.7 to 1.3 bar absolute pressure), $CO_2$, in much more significant amounts than other components (principally nitrogen) of the air in the passenger cabin. The sorbent is also adapted to have its adsorbed $CO_2$ subsequently desorbed, preferably under mild conditions (e.g., by being heated, e.g., up to 50 to 120° C.). Preferably, the solid particles of the sorbent in the closed container are in a packed bed or a fluidized bed, more preferably a fluidized bed. The closed container has an inlet for air from the passenger cabin and an inlet for heated air (e.g., from the vehicle motor) and has an outlet for air to be returned to the passenger cabin and an outlet for air containing desorbed $CO_2$ to be vented to the exterior of the vehicle as described below. Preferably, the inlets are on vertically opposite sides of the vacuum chamber of the closed container. The passage of air through the sorbent in the vacuum chamber of the closed container provides a very low pressure drop system which does not require high pressure pumping of the air through the sorbent.

The sorbent can be any conventional sorbent, to which $CO_2$ will preferentially adhere (relative to other gaseous components of air from a vehicle's passenger cabin) but which can be recovered from the sorbent, preferably using mild conditions. The sorbent is preferably adapted to adsorb preferentially the desire gaseous component under ambient conditions, e.g., at 20-40° C. and at 0.7 to 1.3 bar absolute pressure, and subsequently to be regenerated under mild conditions, preferably by being heated, e.g., up to 50 to 120° C. While inorganic sorbents can be useful, because they typically have high physical strength, they generally require high temperature and pressure for adsorption and/or desorption of a gaseous component. For this reason, such sorbents are not preferred and are generally unsuitable for household use or other applications under mild conditions. Activated carbon, e.g. DEA embedded activated carbon, can also be used. However, such sorbents are generally not sufficiently stable for a prolonged use and tend to degrade under room conditions after two months.

Suitable sorbents include zeolites (also referred to as molecular sieves), ceramic based materials, such as alumina, silica, and silica alumina, titanium dioxide, silica gel, activated carbon and organic polymers, such as polystyrene, modified by amines, such as Diethanolamine (DEA) or Polyethylenimine (PEI) or a divinylbenzene based amine or ethylenediamine. Preferred are sorbents that can be readily regenerated for reuse, particularly when recovering the adsorbed $CO_2$. For example, the sorbent can be an amine-modified particular material, based on cellulose, such as an amine-modified nanofibrilated cellulose as described in WO2014/170184 A1 and WO2010/091831 A1 or ion exchange resins having benzyl amine groups as described in WO00/02643 A1. More preferred for adsorbing and desorbing $CO_2$ are polymeric sorbents having a primary amino functionality as described in WO2016/037668 A1. Even more preferred as sorbent is a free base amine bead functionalized with the primary amine benzyl amine and supported on a porous polyester structure crosslinked with divinylbenzene, particularly a sorbent which is in the form of spherical beads of polystyrene, cross-linked with 8-10% divinylbenzene modified with methylamine.

The sorbent preferably has an activity expressed as total capacity of at least 2 eq./l, more preferably at least 2.1 and yet more preferably at least 2.2. The solid particles of the sorbent preferably have a uniformity coefficient of at most 1.9, more preferably at most 1.8.

Preferably, sorbent particles are used which comprise a polymer support. The selection of the polymer to be used should be governed by the requirement that the polymer must not be subject to undue decomposition during the desorption process, should be non-volatile in nature and should not affect the adsorption or chemical properties of the adsorbent. It should also not be dissolved or decomposed by the gas flow or humidity. Among the polymers which can be employed are the polyamides, such as nylon; the polyesters, such as terylene; the vinyls, such as polyvinyl chloride; the acrylics, such as polymethylmethacrylate, polyurethanes, optionally functionalised polystyrene such as sulfonated or carboxylated styrene and divinyl benzene copolymers, quaternary ammonium alkyl substituted styrene and divinylbenzene copolymers, natural and synthetic powdered zeolite and the like, diatomaceous earth, activated carbon, activated alumina, activated silica gel, montmorillonite, bentonite and surface active clays in general. Mixtures of these materials can also be employed.

Any suitable flow direction may be employed, including axial or radial flow, or combinations thereof. Axial flow herein refers to a flow parallel to flow channels, whereas radial flow is perpendicular. The flow direction in the sorbent may preferably comprise at least in part a radial component, which may have the advantage of avoiding 'air channeling', and promoting a good mixing of the sorbent particulates or beads, and thus $CO_2$ uptake and desorption.

The nature of the sorbent particles can vary depending upon the flow and concentration of the air stream, from which $CO_2$ is to be ad- and desorbed. Preferred sorbent particles are light and porous, solid particles or beads having high surface areas per volume. The size and density of the light and porous, solid sorbent particles are not critical, so long as the particles can be readily fluidized under conventional conditions in the closed container by a low pressure stream of air, preferably provided by a fan, through the particles. The particles of adsorbent can vary over a wide range of average particle sizes. Of course, the larger the particle size, the lower is the apparent surface area per unit of weight of the adsorbent. One of the important advantages of the present invention is that the adsorbent can be in finely-divided form and, therefore, of small particle size. Consequently, a large apparent surface area of adsorbent is exposed for adsorption purposes. This means that a more effective and efficient use may be made for each unit of weight of adsorbent substance, which is crucially important in particular for aircraft, but also for passenger vehicles.

The closed container for the solid sorbent particles preferably has:
  a first inlet for a first inlet conduit providing fluid communication for a first stream of the air from the interior of a passenger cabin of a vehicle to the interior of the container and its sorbent;
  a first outlet for a first conduit providing fluid communication for a second stream of air depleted in $CO_2$ from the interior of the container and its sorbent to the interior of the cabin;
  a second inlet for a second inlet conduit providing fluid communication for a third stream of air from the exterior of the cabin to the interior of the container and its sorbent; and
  a second outlet conduit providing fluid communication for the fourth stream of air enriched in $CO_2$ from the interior of the container and its sorbent to the exterior of the cabin.

A conventional compressor or fan can be used to provide each stream of air into the inlets, and out of the outlets, of the closed container and its vacuum chamber and through its sorbent, and preferably also to fluidize the solid particles of the sorbent.

If desired a plurality, preferably one or two, more preferably just one, of the closed, containers for the sorbent is used in the apparatus and process of this invention. The plurality allows, for example:
  the sorbent in one container to contact, the first stream of air while the sorbent in another container is contacting the third stream of air; or
  the sorbent in one container to contact, the first stream of air while the sorbent in another container is contacting the second stream of air, and while the sorbent in still another container is contacting the third stream of air and while the sorbent in yet another container is contacting the fourth stream of air.

The apparatus and process of this invention provide means for removing $CO_2$ generated by passengers in the air in the interior of a cabin of a vehicle that can be made:

simple and reliable because they use closed containers for their sorbent particles and dedicated gas conduits;

compact because they can preferably use packed beds, more preferably use fluidized beds, of their sorbent particles in their closed containers;

economical to construct and operate because their preferred packed beds, more preferred fluidized beds, of their sorbent particles require only low energy to operate, i.e., only low gas pressures, which can be provided by low energy fans.

The apparatus of this invention can be used in a cyclic adsorption/desorption process to: i) separate $CO_2$, generated by passengers in the air in the interior of a cabin of a vehicle from the remainder of the cabin air, by adsorbing the $CO_2$ on a particulate sorbent; and ii) subsequently desorbing the $CO_2$ from the sorbent to regenerate the sorbent for reuse in step i). In both steps, air is preferably passed through a packed or fluidized bed, more preferably a fluidized bed, of particles of the sorbent on a closed container. In a fluidized bed of this invention, particular densities and weights of the adsorbent particles are not considered critical. Likewise, particular velocities and/or pressure drops of an air stream through a fluidized bed of this invention are not considered critical. Nor are particular bed expansion ratios, bed fluctuation ratios or fluidization qualities of a fluidized bed of this invention considered critical.

In the packed or fluidized bed of particles of the sorbent in each closed container, each inlet conduit is preferably in direct fluid communication with a lower portion, more preferably the bottom, of the interior of the container and with a lower portion, preferably the bottom, of the sorbent. Also preferably in each closed container, a separate porous distributor, more preferably a porous sintered metal or a porous ceramic plate, is within the lower portion, preferably the bottom, of the interior of the container between each of its inlet conduits and the lower portion, preferably the bottom, of its sorbent. Also preferably in each closed container, each outlet conduit is In direct fluid communication with an upper portion, preferably the top, of the interior of the container and with an upper portion, preferably the top, of its sorbent.

During the adsorption step, air from the passenger cabin can be forced by a compressor or fan, preferably a fan, to flow through the closed container, preferably under ambient conditions, more preferably at 20-40° C. and at 0.7 to 1.3 bar absolute pressure. Thereby, $CO_2$ in the cabin air will be bound at the surface of the sorbent particles in the closed container. Thereafter, the air in the closed container, with reduced $CO_2$, can be returned to the passenger cabin.

During the subsequent desorption step, the flow of the air from the passenger cabin through the closed container can be stopped, and the sorbent particles in the closed container can be heated, preferably under mild conditions, more preferably up to 50 to 120° C. This step can provides a gas stream effluent from the closed container that is highly concentrated in $CO_2$ and that can be discarded outside the passenger cabin. Heating of the sorbent particles can be carried out in any conventional manner, such as by passing a heated air stream from outside the cabin, preferably heated by the motor of the vehicle and/or by a battery system in the case of an at least partially electrically propelled vehicle, through the sorbent particles in the closed container. For this purpose, the heated air can be supplied by a compressor or fan, preferably a fan. Alternatively, the adsorbent particles can be heated by heat exchange elements or heating elements in the closed container while air from outside the cabin is passed through the adsorbent particles.

The heating may advantageously use waste heat from the motor of the vehicle and/or vehicle battery system. The present invention therefore also relates to the use of waste heat generated by a vehicle motor and/or vehicle battery system to regenerate an adsorbent.

The invention claimed is:

1. An apparatus for separating and removing $CO_2$ generated by one or more passengers in the air in an interior of a cabin of a vehicle comprising:
    a) one or more, closed containers, each container having an interior that holds loose, light and porous, solid particles of a sorbent, preferably a packed bed or a fluidized bed of the particles of the sorbent:
        i) which can remove $CO_2$ from a first stream of the air when the first stream is contacted with the sorbent to form a second stream of air depleted in $CO_2$ and
        ii) from which $CO_2$ can be removed when a third stream of air is contacted with the sorbent to form a fourth stream of air enriched in $CO_2$;
    b) a first inlet conduit providing fluid communication for the first stream of the air from the interior of the cabin to the interior of each container and to the sorbent particles therein;
    c) a first outlet conduit providing fluid communication for the second stream of air depleted in $CO_2$ from the interior of each container and from the sorbent particles therein to the interior of the cabin;
    d) a second inlet conduit providing fluid communication for the third stream of air from an exterior of the cabin to the interior of each container and to the sorbent particles therein;
    e) a second outlet conduit providing fluid communication for the fourth stream of air enriched in $CO_2$ from the interior of each container and from the sorbent particles therein to the exterior of the cabin; and
    f) a heater for heating the third stream of air between the exterior of the cabin and the interior of each container and the sorbent particles therein,
    wherein the sorbent is a free base amine bead functionalized with a primary amine benzyl amine and supported on a porous polyester structure crosslinked with divinyl benzene, or
    wherein the sorbent is in the form of spherical beads of polystyrene, cross-linked with 8-10% divinylbenzene modified with methylamine.

2. The apparatus of claim 1 having a single closed container for the solid particles of the sorbent.

3. The apparatus of claim 1, wherein the solid particles of the sorbent comprise a fluidized bed in each container.

4. The apparatus of claim 1, wherein each inlet conduit is in direct fluid communication with a lower portion of the interior of one of the containers and with a lower portion of its sorbent.

5. The apparatus of claim 4, wherein a separate porous distributor is within the lower portion of the interior of each container between each of its inlet conduits and the lower portion of its sorbent.

6. The apparatus of claim 4, wherein each outlet conduit is In direct fluid communication with an upper portion of the interior of one of the containers and with an upper portion of its sorbent.

7. The apparatus of claim 1, wherein the sorbent is an amine-containing particulate material.

8. The apparatus of claim 1, wherein the sorbent has an activity expressed as a total capacity for separating and removing CDs of at least 2 eq./l.

9. The apparatus of claim 1, wherein the sorbent particles have a uniformity coefficient of at most 1.9.

10. The apparatus of claim 1, wherein the heater is connected to a motor of the vehicle, or to a battery system in the case of an at least partially electrically propelled vehicle.

11. The apparatus of claim 10, wherein the third stream of air, heated by the heater connected to the motor or the battery system, is supplied by a compressor or fan through the sorbent particles in the closed container.

12. The apparatus of claim 10, wherein the second inlet conduit for each container extends through the sorbent particles therein and heating the sorbent particles by heat exchange with the third stream.

13. A process for separating and removing $CO_2$ generated by one or more passengers in the air in the interior of a cabin of a vehicle comprising the steps of:
   a) providing a first stream of the air from the interior of the cabin to an interior of each closed container of the apparatus of claim 1 and to the sorbent particles therein through the first inlet conduit of the apparatus; and then
   b) providing a second stream of air depleted in $CO_2$ from the interior of each container of the apparatus of claim 1 and from the sorbent particles therein to the interior of the cabin through the first outlet conduit of the apparatus; and then
   c) providing a third stream of the air from an exterior of the cabin to the interior of each container of the apparatus of claim 1 and to the sorbent particles therein through the second inlet conduit of the apparatus; and then
   d) providing a fourth stream of air enriched in $CO_2$ from the interior of each container of the apparatus of claim 1 and from the sorbent particles therein to the exterior of the cabin through the second outlet conduit of the apparatus;
   wherein the process is characterized by heating the third stream of air between the exterior of the cabin and the interior of the container and the sorbent particles therein.

14. The process of claim 13 wherein the third stream of air is heated by a motor of the vehicle and/or by a battery system in the case of an at least partially electrically propelled vehicle.

15. The process of claim 14, wherein the heating is done by waste heat from the motor of the vehicle and/or vehicle battery system.

\* \* \* \* \*